US009893532B2

(12) United States Patent
Harrison

(10) Patent No.: US 9,893,532 B2
(45) Date of Patent: Feb. 13, 2018

(54) SYSTEM AND METHOD FOR A MESH POWER SYSTEM

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 447 days.

(21) Appl. No.: 14/036,556

(22) Filed: Sep. 25, 2013

(65) Prior Publication Data

US 2014/0097688 A1 Apr. 10, 2014

Related U.S. Application Data

(60) Provisional application No. 61/710,255, filed on Oct. 5, 2012.

(51) Int. Cl.
| | | |
|---|---|---|
| *H02J 1/10* | (2006.01) | |
| *H02J 4/00* | (2006.01) | |
| *H02J 3/38* | (2006.01) | |

(52) U.S. Cl.
CPC ............... *H02J 4/00* (2013.01); *H02J 3/381* (2013.01); *Y10T 307/50* (2015.04)

(58) Field of Classification Search
CPC ............ H02J 4/00; H02J 3/381; Y10T 307/50
USPC ............................................................ 307/43
See application file for complete search history.

(56) References Cited

U.S. PATENT DOCUMENTS

| | | | |
|---|---|---|---|
| 6,969,967 B2 | 11/2005 | Su | |
| 8,618,456 B2* | 12/2013 | Hinman | H02H 7/1222 250/203.4 |
| 8,638,581 B2 | 1/2014 | Zacharias et al. | |
| 2008/0055953 A1 | 3/2008 | Lacaze | |
| 2008/0197952 A1* | 8/2008 | Wang | H01F 30/12 336/5 |
| 2011/0133558 A1* | 6/2011 | Park | H02J 3/32 307/66 |
| 2011/0205768 A1 | 8/2011 | Svensson | |
| 2011/0273017 A1* | 11/2011 | Borup | H02J 3/383 307/63 |

(Continued)

FOREIGN PATENT DOCUMENTS

| | | |
|---|---|---|
| JP | 2008535451 A | 8/2008 |
| JP | 2010193576 A | 9/2010 |

(Continued)

OTHER PUBLICATIONS

Sung-Geun Song, Sung-Jun Park; Multilevel inverter using cascaded 3-phase transformers with common-arm configuration. Apr. 29, 2011, Electtric Power System Research 81, p. 1672-1680.*

(Continued)

*Primary Examiner* — Rexford Barnie
*Assistant Examiner* — Toan Vu
(74) *Attorney, Agent, or Firm* — Moser Taboada

(57) ABSTRACT

A power mesh system and method comprising at least three polyphase power devices of a plurality of polyphase power devices, each having a phase connection for each phase, where each polyphase power device has each phase connection coupled to at least one phase connection of another polyphase power device to form a two dimensional array of power devices.

17 Claims, 10 Drawing Sheets

(56) References Cited

U.S. PATENT DOCUMENTS

| | | | | |
|---|---|---|---|---|
| 2012/0092906 A1* | 4/2012 | Hasler | ............... | H02J 3/1857 |
| | | | | 363/39 |
| 2013/0057200 A1* | 3/2013 | Potts | ............... | H02M 3/33584 |
| | | | | 320/107 |
| 2013/0063063 A1* | 3/2013 | Chi | ............... | H02P 6/002 |
| | | | | 318/400.26 |
| 2013/0070489 A1* | 3/2013 | Zhang | ............... | H02M 5/45 |
| | | | | 363/36 |
| 2013/0328309 A1* | 12/2013 | Fujii | ............... | F03D 7/0272 |
| | | | | 290/44 |

FOREIGN PATENT DOCUMENTS

| | | |
|---|---|---|
| WO | WO 02-063758 A1 | 8/2002 |
| WO | WO 02/063758 A1 | 8/2002 |
| WO | WO 2010/145706 A1 | 12/2010 |

OTHER PUBLICATIONS

International Search Report and Written Opinion dated Jan. 17, 2014 for Application No. PCT/US2013/061882, 10 pgs.
European Search Report dated Mar. 14, 2016 for European Application No. 13843713.2, 7 pages.
European Office Action dated Dec. 22, 2016 for Application No. 13843713.2.

\* cited by examiner

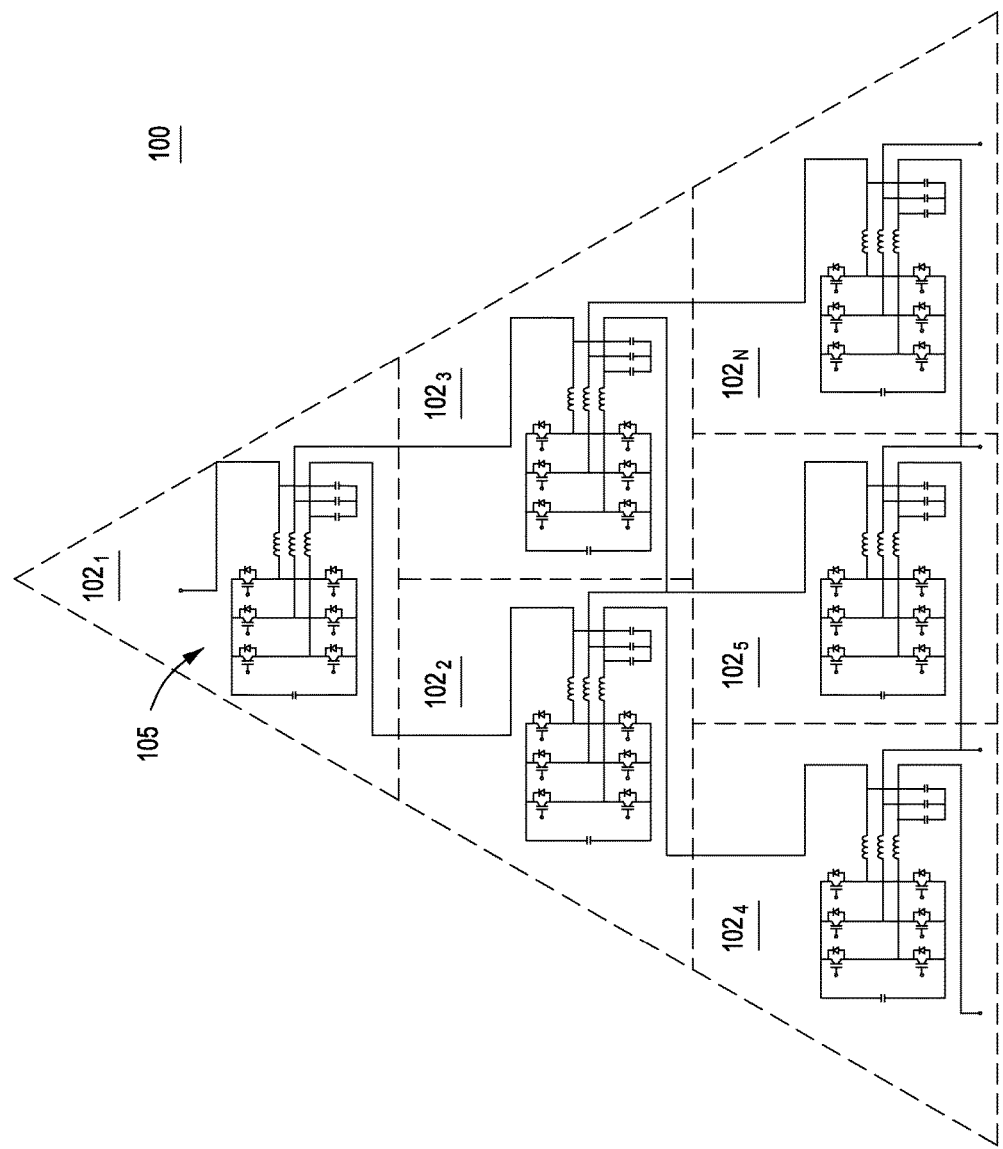

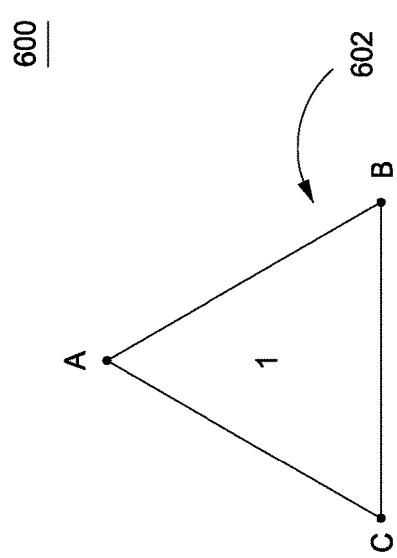
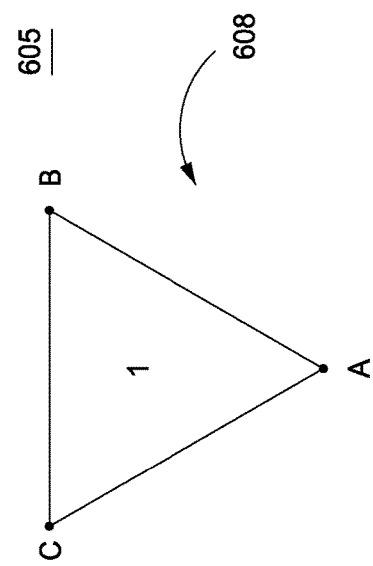
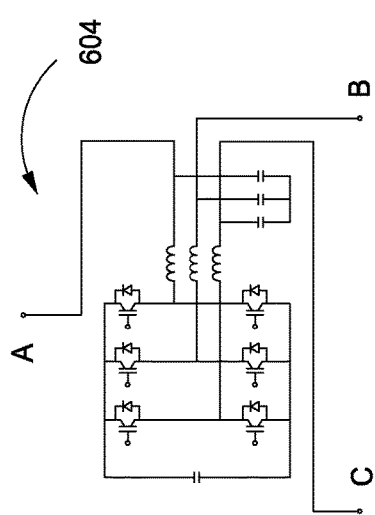
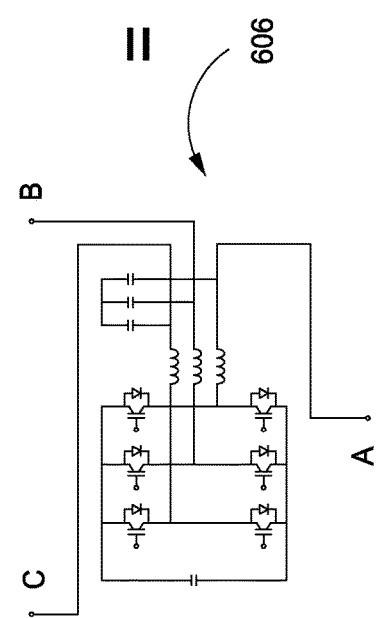
FIG. 6A
FIG. 6B

US 9,893,532 B2

SYSTEM AND METHOD FOR A MESH POWER SYSTEM

BACKGROUND

Field

Embodiments of the present invention generally relate to polyphase power generation, distribution and/or consumption systems and, more particularly, to mesh three-phase power generation, distribution and/or consumption systems.

Description of the Related Art

In modern power systems, power is generated and consumed in a distributed manner. Polyphase systems are used for generation, distribution and consumption of power. Specifically, a polyphase system may comprise three-phase power generation, three-phase distribution networks and three-phase loads.

Power conversion units are used to convert DC power produced by power generator into AC power to be coupled to the AC power grid. Power generators in such systems may include turbines (e.g., gas, coal-fired, or hydroelectric power generators), fuel cells, wind turbines, solar panels, and the like. Typically, the power conversion units are coupled in series or parallel. In a series connected system of n devices, each unit sees a voltage of V/n and a current of I. While in a parallel connected system of n devices, each unit sees a voltage of V and a current of I/n. To handle such substantial amounts of power within a series or parallel connected system, either a large current or a large voltage must be accommodated. Due to the need for high-voltage or high-current components, system costs rise with the amount of current or voltage that must be handled within the system.

Therefore, there is a need in the art for an improved polyphase connection topology to reduce the voltage and current handling requirements within power generation as well as robust system redundancy.

SUMMARY

A mesh power system substantially as shown in and/or described in connection with at least one of the figures, as set forth more completely in the claims.

In some embodiments, a power mesh system comprises at least three polyphase power devices of a plurality of polyphase power devices, each having a phase connection for each phase, where each polyphase power device has each phase connection coupled to at least one phase connection of another polyphase power device to form a two dimensional array of power devices.

In some embodiments, a method for a power mesh system comprises connecting at least three polyphase power devices of a plurality of polyphase power devices, wherein each polyphase power device comprises at least six switches, at least one capacitor, and a phase connection for each phase. The method coupling each phase connection to at least one phase connection of another polyphase power device to form a two dimensional array of polyphase power devices. The method also interconnecting the two dimensional array via phase connections to a polyphase transformer; and controlling the switches of each polyphase power device to sink power from or source power to the polyphase transformer.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1C is a detailed diagram of the mesh power system in FIG. 1A in accordance with at least one embodiment of the present invention;

FIGS. 6A, 6B, and 6C depict an exemplary embodiment of representative triangle structures in accordance with at least one embodiment of the present invention;

DETAILED DESCRIPTION

Embodiments of the present invention comprise a mesh connected power system having $(n+1)(n+2)/2$ power devices for sparse mesh configurations and $(n+1)(n+2)$ power devices for dense mesh configurations. Power devices may be polyphase power sources (or, in some embodiments, a polyphase power sink or a combination of power sources and sinks). The power devices are connected to form a two dimensional array of interconnected power devices. Hereinafter, the term "power device" shall mean any polyphase power source or power sink. In some embodiments, a "power device" may be a power converter. Within the mesh, Kirchoff's circuit laws apply in all cases. As such, each powered device sees a voltage of V/n and a current of I/n. Consequently, high-voltage and/or high-current components are not required.

Figure 1A:
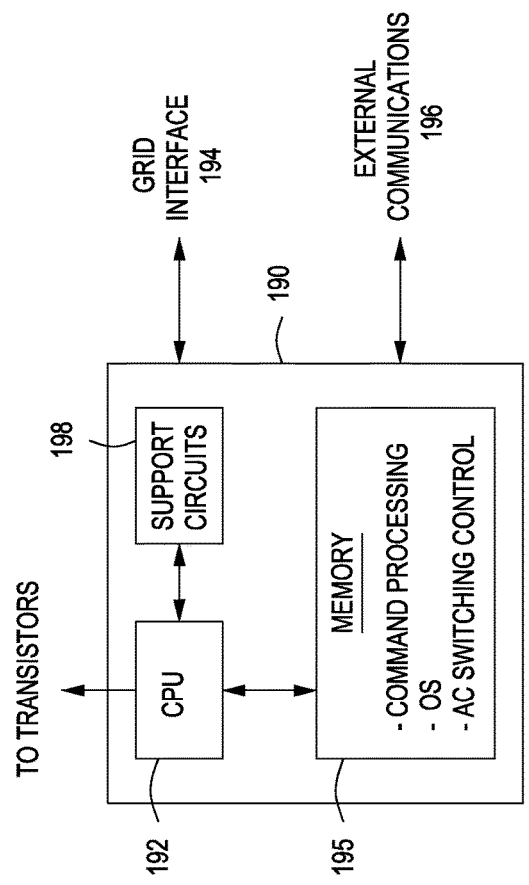
FIG. 1A is an illustration of a mesh power system diagram in accordance with at least one embodiment of the present invention.
Figure 1A:
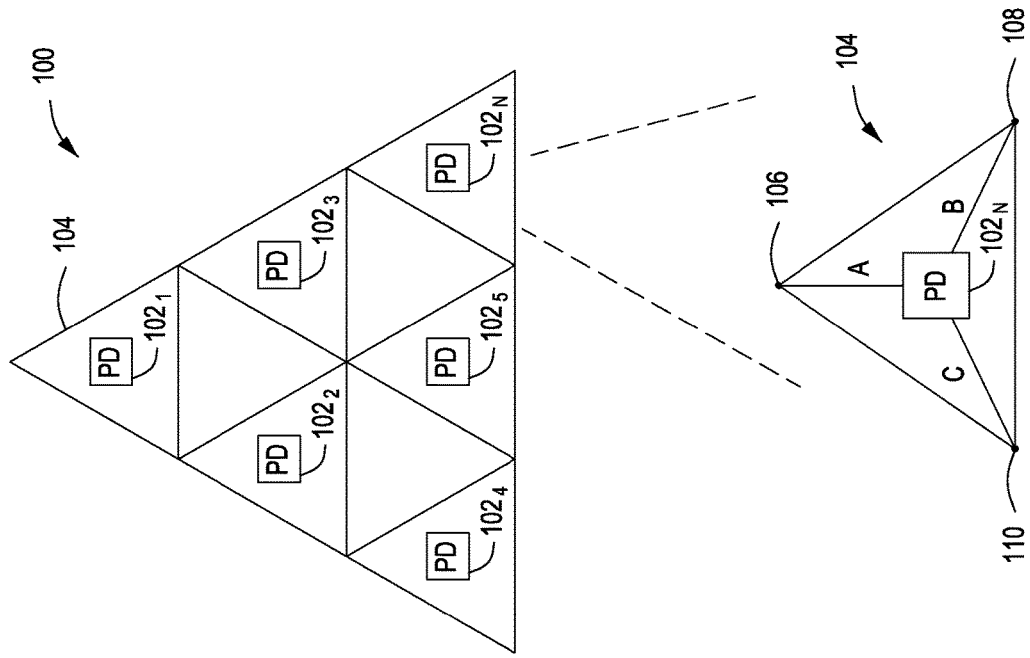

FIG. 1A is an illustration of a mesh power system diagram in accordance with at least one embodiment of the present invention. Although the mesh topology may be applied to other forms of polyphase devices, the exemplary embodiment shown in FIG. 1A comprises a plurality of three-phase power devices (PD) $102_1 \ldots 102_N$. For purposes of visual explanation, in a three-phase mesh topology, the power devices are depicted as triangles 104 with each vertex (106, 108, and 110) of the triangle 104 representing one phase connection of the power device $102_N$. However, other shapes can be envisioned (e.g., square block). As will be discussed further below, the triangle of power devices forms a power "unit" that can be used to extend the mesh into a variety of shapes including square or rectangle, hexagonal, and the like.

The mesh topology is physically finite, but must appear to be electrically infinite from the point of view of each power device. To do so one can establish boundary conditions that make the mesh appear to be electrically infinite (e.g., interconnection to a shared transformer). Otherwise, the boundary edges of a finite mesh may be "wrapped" to interconnect opposite edges at the boundaries of the mesh topology to also appear electrically infinite.

There is no need for any energy storage within the power device $102_N$ when using three-phase power devices. Additionally, a three-phase power device $102_N$ provides a 2:1 power utilization advantage over a single-phase power device. A three-phase mesh topology looks substantially similar to a triangle comprising up to $(n+1)(n+2)/2$ or $(n+1)(n+2)$ power devices. Wherein "n" represents the largest number of power devices in a given row (e.g., 3).

As will be discussed further below, the power devices $102_N$ may be comprised of switches depicted as transistors. A controller 190 comprises a CPU/processor 192, support circuits 198, and memory 195 containing instructions and algorithms. The CPU 192 processing inputs and outputs to the transistors/switches. Other embodiments may include external communications 196 (i.e., gateway) and a grid interface 194. Alternative embodiments may use control algorithms on a custom Application Specific Integrated Circuit (ASIC). The controller 190 determines the switching of the transistors.

In some embodiments the mesh topology includes power devices $102_N$ that only export power (power source) or only import power (power sink or load). Thus, in other embodiments, a mesh topology may comprise power devices $102_N$ where some of the power devices $102_N$ import power and some of the power devices $102_N$ export power.

Each power device $102_N$ can be individually controlled by controller 190 to produce a voltage independent of other powered devices within the mesh. Allowing such independent control, forms a "soft" mesh topology. In this way, each power device $102_N$ can control its output power independent of the other power devices. In addition, each power device can control its power factor independent of other power devices within the "soft" mesh topology. Other embodiments may include a "stiff" mesh, wherein the power devices are not permitted to independently vary their output voltage. Rather, in such embodiments, the output voltage of all individual power modules is a proportion of the total system voltage and the power factor of each power device is individually controlled to accommodate any differences in the output power between different module and to also affect the overall system power factor.

In one embodiment, the entire mesh topology power is controlled to vary voltage and current of the individual power devices in a coordinated manner (e.g., via controller 190). In embodiments where independent controls of voltage and current across the mesh, then a soft mesh topology is needed to relax controls on various power devices in the mesh. In any topology, total system voltage is the sum of all power device voltages, total system current is the sum of all power device currents, and total system power factor is the average of all power device power factors.

In some embodiments, control of the power devices within the mesh may be performed through power line communications (PLC). Other control communications techniques may be used such as wireless communications (e.g., WiFi or Zigbee). An adaptation of conventional mesh communications techniques may be used. In one embodiment, one power device may be used as the control node within the topology and communicate control signals to the other power devices within the mesh topology.

In other embodiments, a Phase Locked Loop (PLL) may be used as a means of coordinating the control of the multiple power devices within a mesh topology. Since the current through all the individual power devices is in phase with the overall system current, a PLL can detect the individual power device current and provide a point of reference for a control circuit.

In some embodiments to facilitate interconnection of three-phase power devices within a mesh topology, hermaphroditic triad connectors may be used to couple power devices to one another. In embodiments with polyphase power devices, hermaphroditic n-phase connectors may be used.

The mesh topologies disclosed herein could be useful as a means of building very large power converters. One example would be for driving large motors. In this example, the boundary condition connections are made in the winding of the motor such that the boundary autotransformers are eliminated.

Another application is in large power inverters, e.g., for "medium voltage" converters, that are intended for direct connection to a medium voltage power utility network. Traditionally, multiple single-phase converters that are connected together in a series string forming the higher voltage that is ultimately used as the connection point to the utility interface similar to that of "cascaded" or "multi-level converter". In such circuits, three independent series strings of this form make up the overall three-phase medium voltage solution. The embodiments disclosed herein of the "mesh power" topology may result in a number of small three phase converters being connected in a mesh topology to form the overall three-phase converter that ultimately connects to the utility interface to similarly respond as medium voltage converters.

Figure 1B:
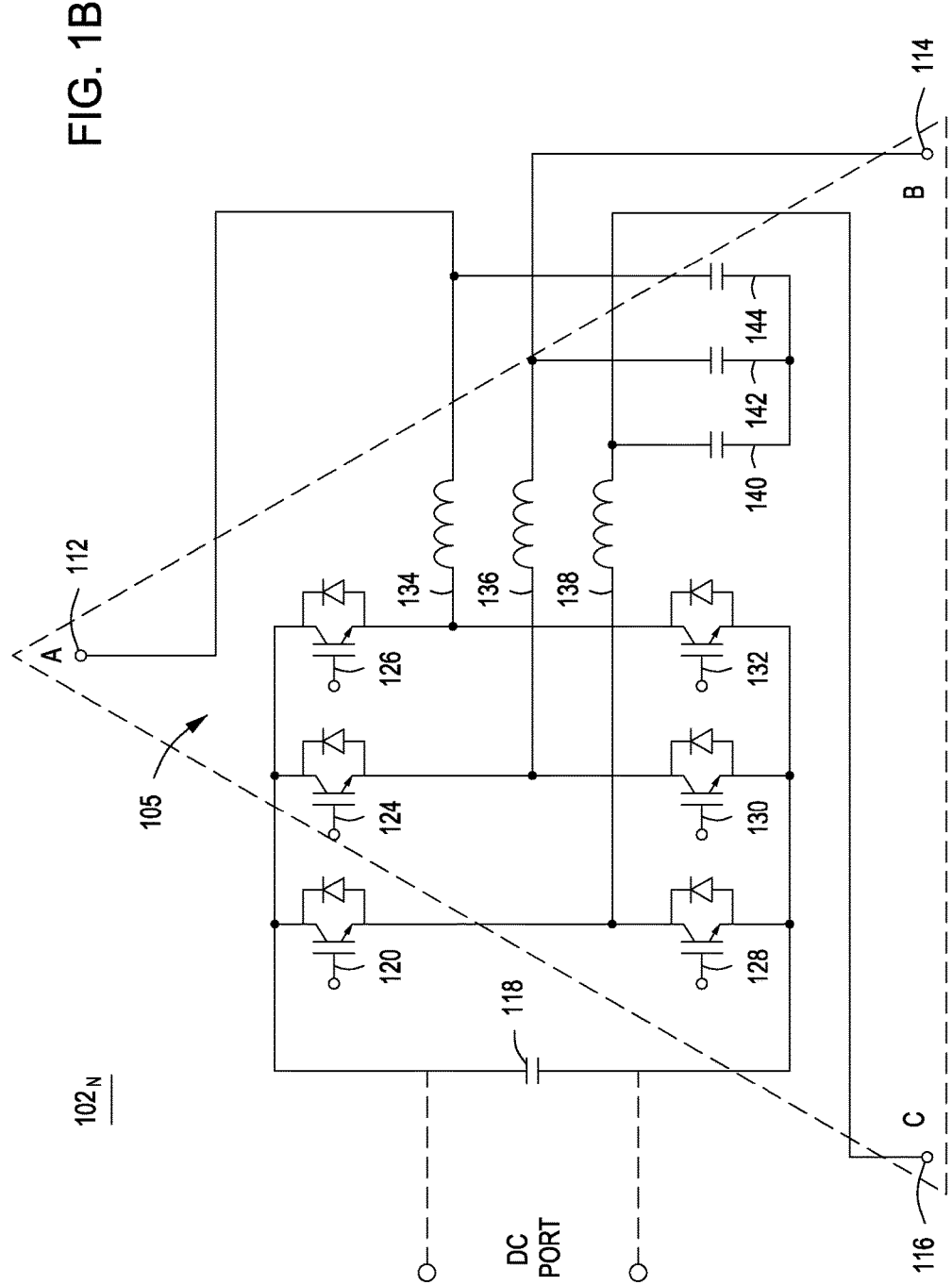
FIG. 1B is a detailed diagram of an exemplary power device in the mesh power system in FIG. 1A in accordance with at least one embodiment of the present invention.

FIG. 1B is a detailed diagram of an exemplary power device $102_N$ in the mesh power system in FIG. 1A in accordance with at least one embodiment of the present invention. FIG. 1B comprises an exemplary power device $102_N$ depicted as a three-phase power converter 105 that could be used to form the building blocks (or elements) of this three phase power mesh. While other three-phase converters may be used, the depicted converter 105 comprises a topology to function as a Voltage Source Inverter (VSI) based Static Synchronous Compensator (STATCON). A VSI based STATCON would find typical application in power utility networks for compensating the reactive power flow by sourcing or sinking reactive current (VAr's). The converter 105 comprises a DC storage capacitor 118, six switching transistors (120, 124, 126, 128, 130, 132), three inductors (134, 136, 138), and three line filter storage capacitors (140, 142, 144). The switching transistors (120, 124, 126, 128, 130, 132) are depicted insulated-gate bipolar transistors (IGBT) for power switching however, the converter 105 may also use using many different semiconductor switch technologies: junction gate field-effect transistor (JFET), metal-oxide-semiconductor field-effect transistor (MOSFET), bipolar junction transistor (BJT), metal-oxide-semiconductor controlled thyristor (MCT), or gate turn-off thyristor (GTO).

From FIG. 1B, the converter 105 may be conceptually viewed as "triangular" based on the three phase connections (112, 114, 116) each respectively representative of phases A, B, and C.

The converter 105 may be viewed as a "single port" converter since the three phase connections are both the input and the output of the converter 105. In other embodiments converter 105 may be a "two port" converter by placing a connection over the DC storage capacitor 118. One port being the three-phase AC connection (112, 114, 116) and the second port is the DC connection to the DC storage capacitor 118. In such an embodiment, the two port converter can operate in either direction converting energy from AC to DC or DC to AC.

FIG. 1C is a detailed diagram of the mesh power system 100 in FIG. 1A in accordance with at least one embodiment of the present invention. FIG. 1C depicts the inclusion of the three-phase VSI STATCON power converter 105 from FIG. 1B in view of FIG. 1A. The exemplary embodiment of the mesh power system 100 thus has six converters 105 interconnected in a configuration to source or sink power as necessary for system redundancy. Thus, in the figures disclosed herein, from the perspective of the power devices, the mesh is electrically infinite. In some embodiments, the perspective is achieved when the boundary edges of the mesh interconnect to opposite edges of the mesh. In other embodiments, boundary conditions of the mesh are met with boundary transformers.

Figure 2:
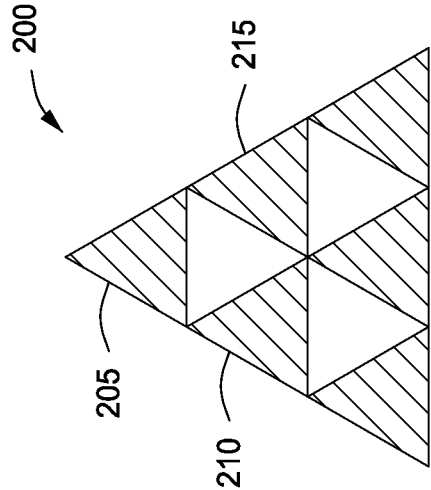
FIG. 2 depicts a triangular sparse mesh in accordance with at least one embodiment of the present invention.

FIG. 2 depicts a triangular sparse mesh topology 200 in accordance with at least one embodiment of the invention. In a sparse mesh, each phase of each power device connects to two other power devices (except at the boundaries). For example, power device represented as triangle 205 is coupled to power devices represented respectfully as triangles 210 and 215. The mesh topology 200 is thus a physically finite mesh with six interconnected power devices that is made to appear electrically infinite when connected to a boundary transformer (not shown).

Figure 3:
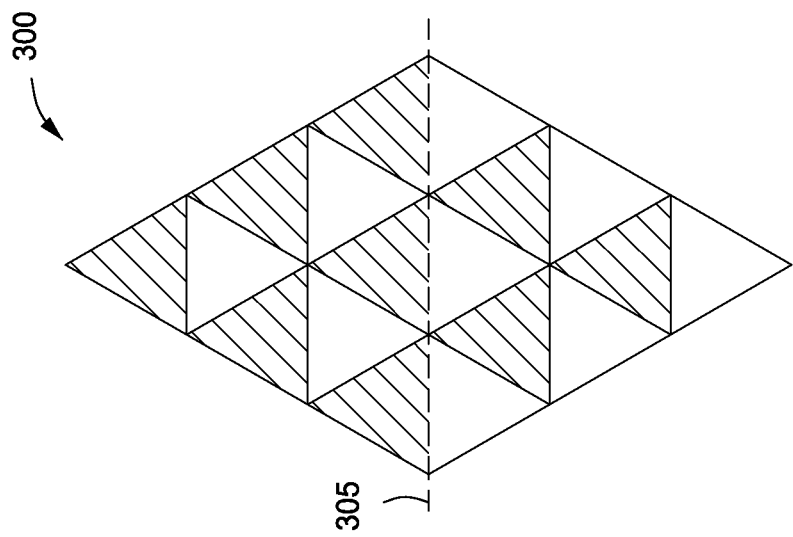
FIG. 3 depicts a rectangular sparse mesh in accordance with at least one embodiment of the present invention.

FIG. 3 depicts a rectangular sparse mesh topology 300 in accordance with at least one embodiment of the invention. FIG. 3 depicts an exemplary embodiment wherein the triangle of power devices (e.g., converters $102_N$) form a power unit to extend the mesh into a substantially rectangular quadrilateral polygon shape. The mesh topology 300 thus has nine interconnected power devices in an apparent electrically infinite mesh. The mesh topology 300 when visualized as folded back along line 305 onto itself by either physically folding or electrically connecting the power devices, opposite edges of the mesh are connected and thus electrically infinite from the point of view of the power devices. In this folded embodiment there is a modification of sequences such that the six power devices above the line 305 would operate in one direction (e.g., sourcing power to the mesh 300) and the three power devices below the line 305 would operate in an opposite direction (e.g., sinking power to the mesh 300).

Figure 4:
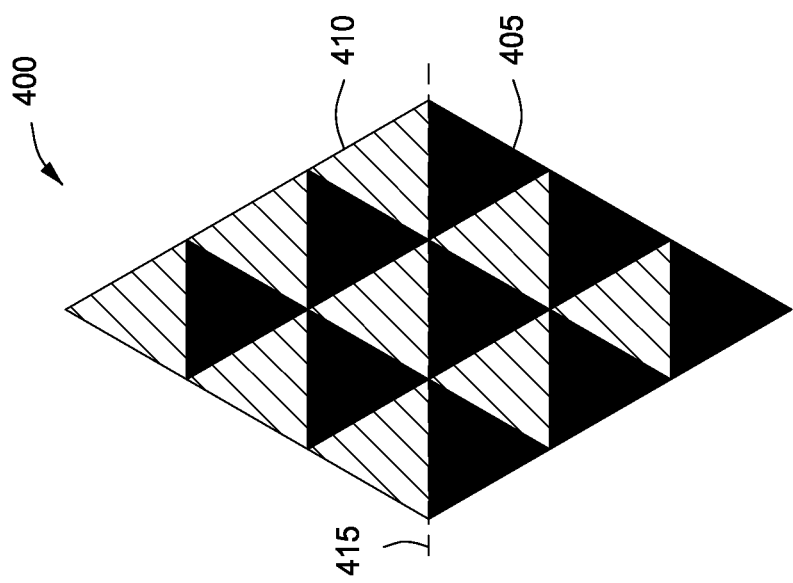
FIG. 4 depicts a rectangular dense mesh in accordance with at least one embodiment of the present invention.

FIG. 4 depicts a rectangular dense mesh topology 400 in accordance with at least one embodiment of the invention. In a dense mesh topology, each phase of each power device connects to five other power devices. The sequence in this embodiment refers to whether the three phase vector is rotating clockwise or counterclockwise. The upward pointing triangles (striped) represent positive sequence (e.g., clockwise rotation), and the downward pointing triangles (black) represent negative sequence (e.g., counterclockwise rotation). In other embodiments, the upward pointing and downward pointing triangles may respectively be negative and positive sequences. The mesh topology 400 when visualized as folded back along line 415 onto itself by either physically folding or electrically connecting the power devices are two larger equilateral triangles. Thus, opposite edges of the mesh 400 are connected and thus electrically infinite from the point of view of the power devices.

Gaps between positive sequence power devices are filled with negative sequence power devices. The positive and negative sequences forming a symmetrical balanced phasor topology. The mesh topology thus has eighteen interconnected power devices in an electrically infinite mesh. Such a dense mesh topology, provides greater system redundancy options.

Figure 5A:
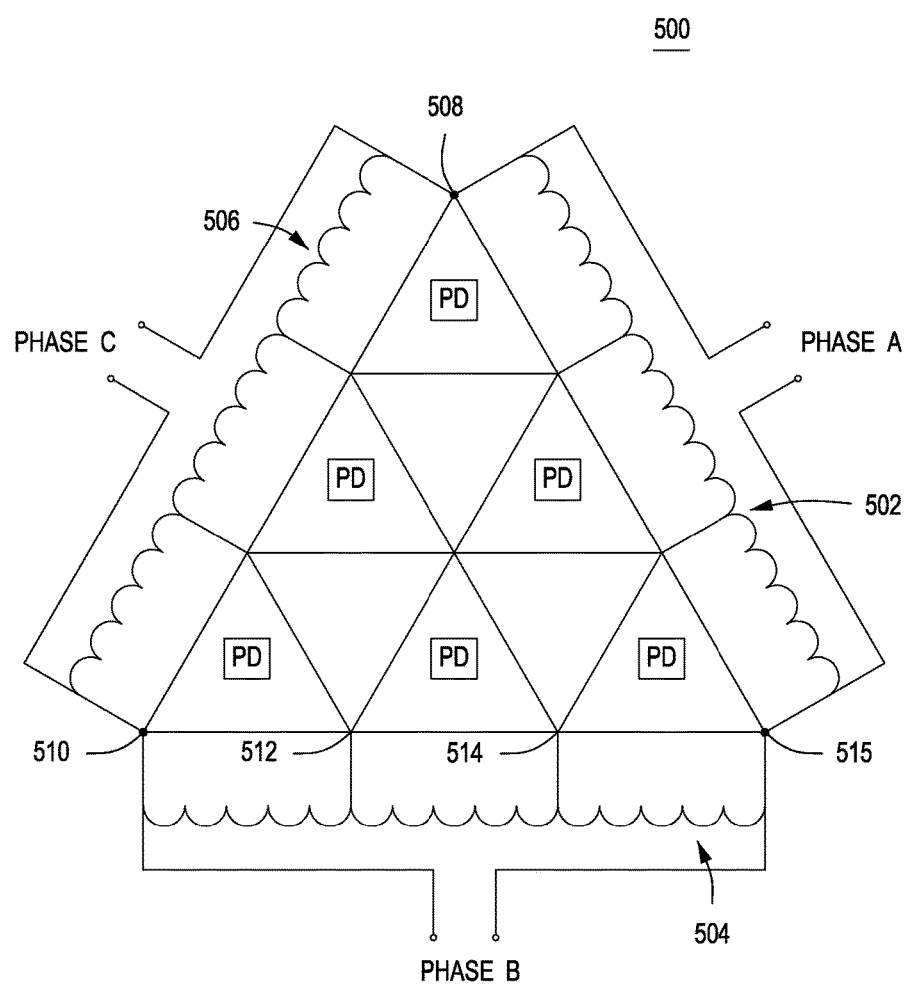
FIG. 5A depicts a sparse mesh power system utilizing boundary line transformers in accordance with at least one embodiment of the present invention.

FIG. 5A depicts a sparse mesh power system 500 utilizing boundary transformers 502, 504, and 508 in accordance with at least one embodiment of the present invention. The mesh power system 500 comprises six power devices (PD) connected in a sparse mesh topology and a plurality (e.g., three) of boundary transformers 502, 504 and 508. The boundary transformers 502, 504, 508 are each coupled to a phase of the mesh topology.

The transformers 502, 504, 506 are autotransformers having a plurality of taps (e.g., transformer core 504 has taps 510, 512, 514, 515), where each tap couples to an edge vertex of the mesh. As such, transformer 502 couples to four vertices along a first side of the triangular mesh and generates phase A, transformer 504 connects to four vertices along a second side of the triangular mesh and generates phase B, and transformer 506 connects to four vertices along a third side of the triangular mesh and generates phase C. The transformers 502, 504, and 506 provide the necessary boundary conditions to support functionality of the mesh topology while appearing electrically infinite to the six power devices.

The topology of FIG. 5A may be used, for example, in a system comprising 256 powered devices (e.g., comprising a 16 by 16 array of solar panels and three-phase power inverters) generating 480 VAC. In such a system, the power inverters can be manufactured with 60V MOSFETs. Such low voltage components enable the power and control electronics to be fully integrated onto a single integrated circuit. The boundary conditions can be met using utility interface single phase, or three-phase, transformers as will be discussed further below. The transformers may be implemented as a central or a distributed transformer. In addition, the system can be designed with fewer power devices for 208 VAC or 400 VAC. As such, the topology forms a modular building block that can be adapted to any voltage output requirement.

Figure 5B:
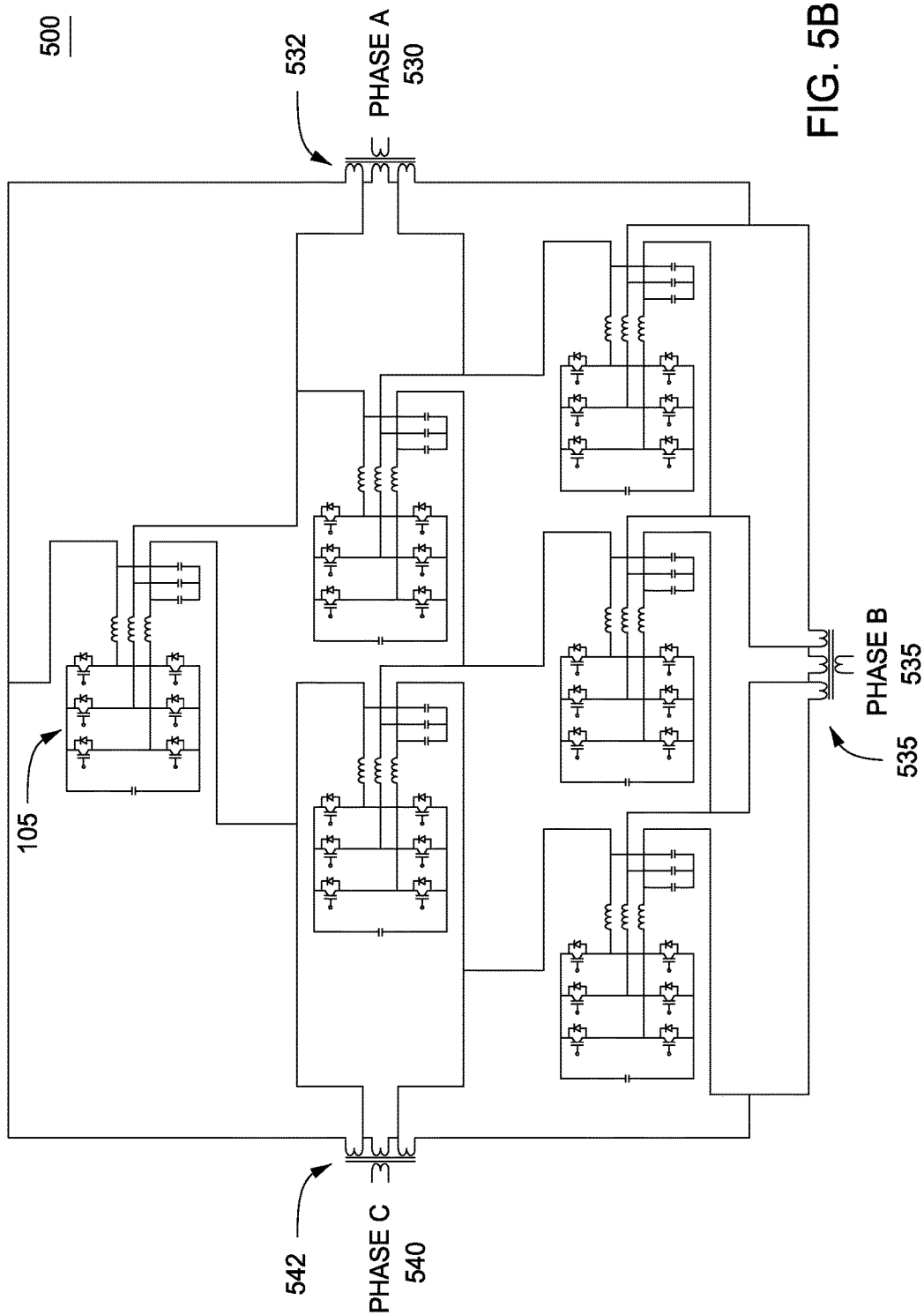
FIG. 5B depicts a detailed sparse mesh power system of FIG. 5A utilizing boundary line transformers in accordance with at least one embodiment of the present invention.

FIG. 5B depicts a detailed sparse mesh power system 500 of FIG. 5A utilizing boundary line transformers in accordance with at least one embodiment of the present invention. While, FIG. 5A uses autotransformers, the depicted embodiment of the system 500 utilizes six of the three-phase VSI STATCON power converter 105 for ease of explanation and as an alternative embodiment. In other words, the system 500 comprises a "six block" mesh, and a line connection transformer that is drawn as three separate single phase transformers (532, 536, 542). Similarly, and accordingly, three individual single phase transformers could also be used in other embodiments. The transformers (532, 536, 542) has three utility side windings being connected in either a "wye" or "delta" configuration to create the three-phase utility connection point. Alternatively, the line connection transformer could consist of a single three-phase (three limb) transformer. The three single phase transformers (532, 536, 542) may be viewed as three individual "limbs" of a single three-phase transformer. In this way, FIG. 5B thus represents three individual single-phase or a single three-phase utility interface transformer. Each transformer capable of sinking or sourcing a different power phase (530, 535, 540).

When applying the system 500 to a standard utility grid, it is preferable to use a single three-phase transformer rather than three single phase transformers. One reason is the single three-phase transformer uses half the copper and iron that is required to make three individual single phase transformers.

Figure 6C:
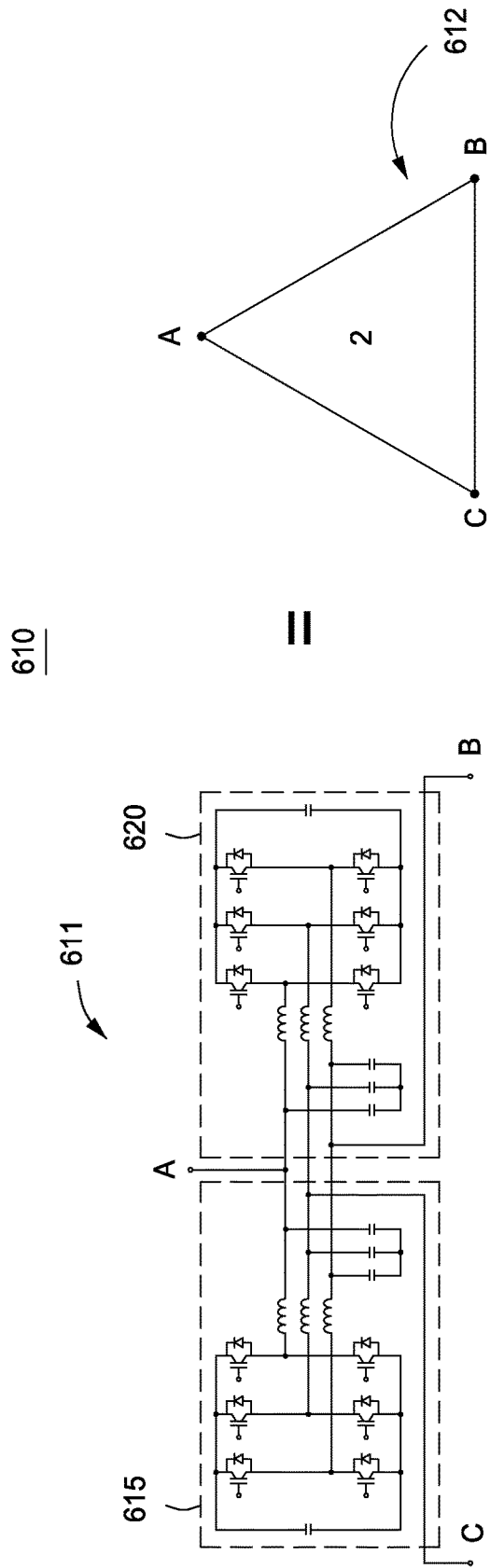

FIGS. 6A, 6B, and 6C depict an exemplary embodiment of representative triangle structures in accordance with at least one embodiment of the present invention. FIGS. 6A-6C when viewed in conjunction note that the number within the triangles represents the number of converters 105 to be represented by the triangle. In this example, the converters 105 may be VSI STATCOM converters used as the primary mesh building block. However, other embodiments may employ other types of converters to form the interconnected mesh topology.

In FIG. 6A, the first diagram 600 depicts an upwards pointing equilateral triangle 602 with a number "1" inside to represent that there is a single power converter 604. In FIG. 6B, the second diagram 605 shows the difference between the upward pointing triangle 602 and downwards pointing equilateral triangle 608 building block. The difference relates to the connection details of the converter 606 to the three corners of the equilateral triangle 608 and more specifically what is referred to as the "sequence" of the converter. The sequence of a three phase converter can be positive or negative and this corresponds to clockwise or counterclockwise rotation of the fundamental three-phase voltage vector.

While other rotations may be used in other embodiments, in the exemplary first diagram 600 the three-phase connections to the power converter 604 are assigned as A, B, and C in a clockwise direction for the upwards pointing triangle 602. Accordingly, all the upwards pointing triangles in a mesh topology will also rotate phases in this same clockwise direction in order to create a resultant large clockwise rotating voltage vector for the entire mesh.

Furthermore, in the aforementioned "sparse" mesh configuration, only triangles of the same type (either upwards pointing or downwards pointing) for the mesh. In such an arrangement, the rotation direction (or sequence order) for each individual power converter will all be the same and equal to that of the entire mesh.

However, in "dense" mesh configurations, there are both upwards and downwards pointing triangles. Applying the same labeling convention, the required sequence order (positive or negative) for the different triangles, achieve an overall resultant mesh voltage that rotates in one direction. Such a rotation is possible since all the upwards pointing triangles 602 will have a three-phase voltage that rotates in one direction (e.g., clockwise: A, B, C, A, B, C . . . ) whereas all the downwards pointing triangles 608 will have a three phase voltage that rotates in the opposite direction (e.g., counter clockwise: C, B, A, C, B, A . . . ).

Hence the difference between an upwards pointing triangle 602 and downwards pointing triangular building block 608 is in relationship. The upwards pointing triangle 602 and the downwards pointing triangle 608 observe opposite sequence order (phase rotation direction) when connected together to form a "dense" mesh configuration.

The third diagram 610 in FIG. 6C shows two identical three-phase power converters (615 and 620) connected in parallel as the represented topology of triangle 612 with the number "2" inside. Each power converter building block is designed to process a certain amount of power, and by connecting two converters in parallel, the combined pair would be able to process twice the power. In other words, the dual pair of converters (615 and 620) will produce twice the output current as a single converter block. The depicted example of diagram 610 has a positive sequence similar to that of diagram 600. However, further embodiments may also be rotated for a negative sequence phase rotation as depicted by the exemplary diagram 605.

In this way, mesh topologies may be made with any number of converters (1, 2, 3, and the like) connected in parallel and the output current of a parallel combination of "n" converters will be "n" times the output current of a single converter. Certain mesh topologies such as the "Star of David" configurations need fundamental building blocks based on 1, 2, or 3 power converters in parallel as discussed below. These paralleled converter mesh topologies can be configured as either positive sequence (upward pointing triangles) or negative sequence (downward pointing triangles) building blocks.

The "n" number of power converters could also be equal to zero (e.g., no converter). Thus, in variations between dense and sparse mesh configurations, negative sequence converters are inserted where no converters existed in the sparse mesh.

Figure 7A:
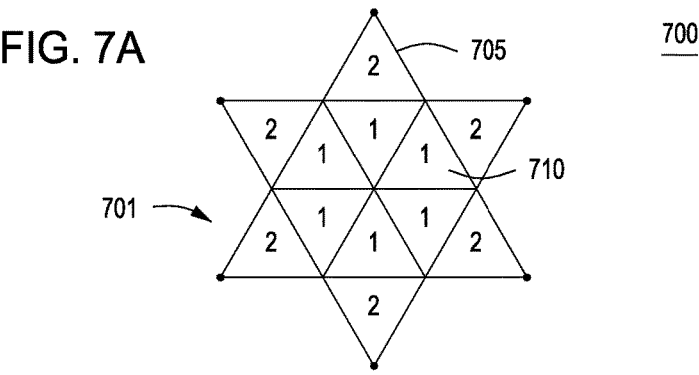
FIGS. 7A and 7B depict exemplary "Star of David" mesh topologies in respective dense and sparse configurations, in accordance with at least one embodiment of the present invention.
Figure 7B:
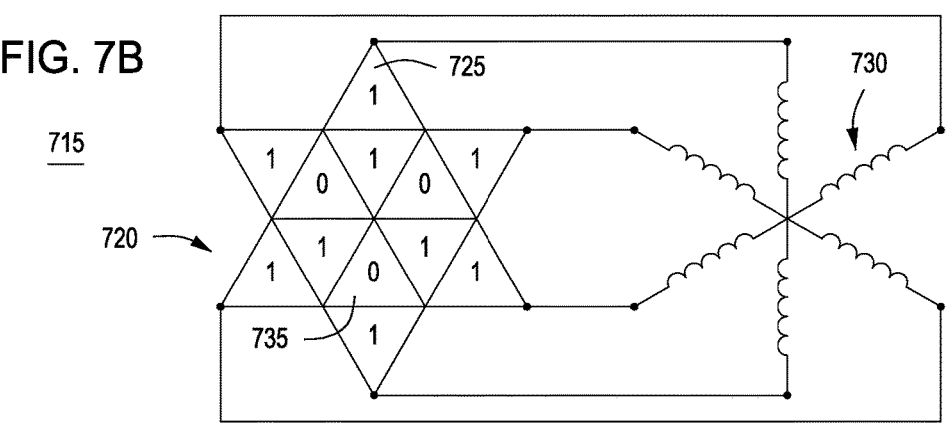

FIGS. 7A and 7B depict exemplary "Star of David" mesh topologies in respective dense and sparse configurations in accordance with at least one embodiment of the present invention. The Star of David topology is the overlapping of two equilateral triangles as described above in the mesh of 500 in FIG. 5A. The Star of David topology allows the outermost six points to have the only connections to the mesh and meet the boundary conditions such that the circuit appears electrically infinite.

FIG. 7A depicts a system 700 with a "Star of David" dense mesh 701 configured such that a triangle in the circuit topology, with a "1" represents a single power device 710 and a "2" represents two power devices 705, totaling 18 power devices. In some embodiments, the single power device 710 is a three-phase converter (e.g., VSI based STATCON). In such embodiments, the triangle with a "2" represents two three-phase converters 705 that are connected in parallel (on their respective 3-phase ports) for 18 individual three-phase converters. The dense mesh 701 is coupled to a six-phase transformer as will be discussed with FIGS. 7B-8B.

FIG. 7B depicts a system 715 with a "Star of David" sparse mesh topology 720 in accordance with at least one embodiment of the present invention. The topology 720 comprises nine power devices 725 forming a six-phase interface. Each power device 725 is designed to handle one third of the system voltage and one third of the system current. In the mesh topology 720, a "0" triangle 735 represents the absence of a power device. In some embodiments, the power devices 725 are three-phase converters such that nine individual three-phase converters are connected to a six-phase transformer 730.

The six-phase transformer 730 satisfies the boundary conditions and couples the six-phase output to the utility power grid. Thus, a six-phase supply in some embodiments is comprised of two identical three-phase power transformers. By reversing the polarity of either all three primary windings or all three secondary windings for one of the transformers, the voltage supplied by one of the transformers becomes 180 degrees out of phase with respect to the other transformer. Thus, a six-phase power supply may be derived from two transformers (three phases from each transformer). The transformers for each mesh net will have different power ratings. In other words, a six-phase transformer (not shown) for mesh 701 will have twice the power rating of six-phase transformer 730 for mesh 720.

Figure 8A:
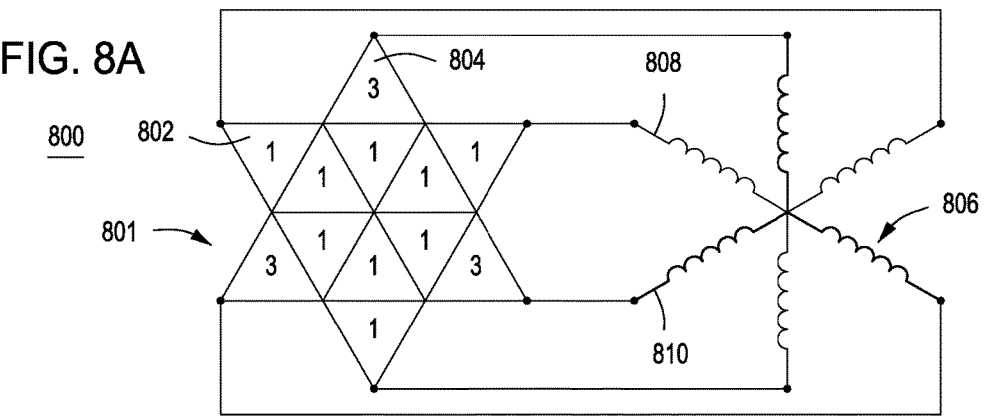
FIGS. 8A and 8B depict detailed Star of David mesh topologies in accordance with at least one embodiment of the present invention.

Such a topology with a six-phase transformer is useful for high-power installations (e.g., 1 megawatt or more). This topology (a unit) may form a building block in a multi-unit, six-phase power system. In other embodiments, the Star of David topology can be formed as a dense mesh using 18 power devices. FIGS. 7B and 8A depict such a dense mesh.

Figure 8B:
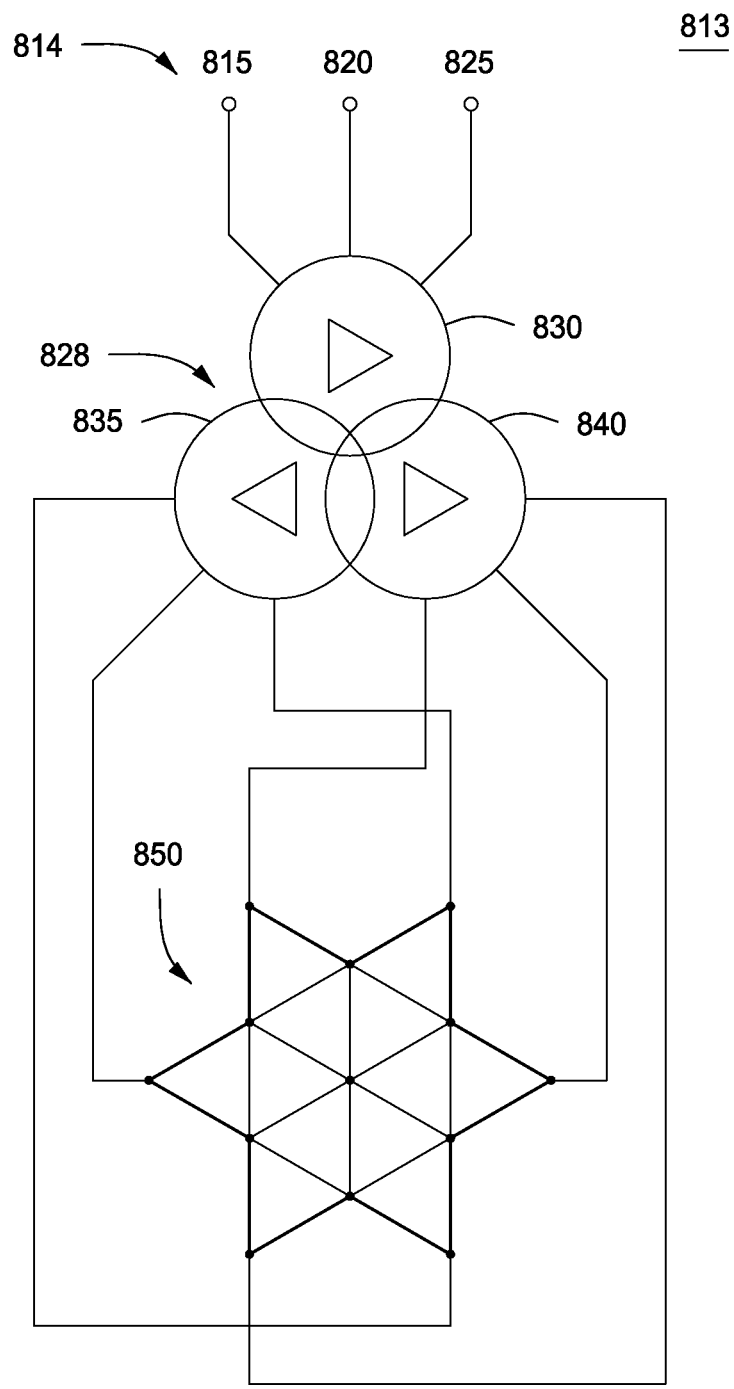

FIGS. 8A and 8B depict detailed Star of David mesh topologies in accordance with at least one embodiment of the present invention. FIG. 8A depicts a Star of David topology dense mesh 801 configured such that a triangle with a "1" represents a single power device 802 and a "3" represents three power devices 804, totaling 18 power devices. FIG. 8A depicts an embodiment of the mesh configuration 801 as a dense mesh comprising converters in single and groups of three connected in parallel. In such embodiments, the triangle with a "3" inside represents three three-phase converters 804 that are connected in parallel (on their respective 3-phase ports) coupled to the single triangles 802 for a total of 18 individual three-phase converters in the dense mesh 801. The dense mesh 801 is coupled to a six-phase transformer 806.

In addition, legs of the transformers may vary in size. For example, the six-phase transformer 806 for the mesh 801 comprises a first three-phase transformer 808 of a different size than the second three-phase transformer 810. For example, the first three-phase transformer 808 may be the same size as a three-phase transformer comprising the six-phase transformer 604, while the second three-phase transformer 810 may be three times the size of the first three-phase transformer 808.

FIG. 8B depicts the system 813 with a 6-phase transformer 828 configuration coupled to the mesh 850. The simplified three-phase transformer symbol in the power utility industry has a circle that is used to represent a set of three-phase windings on a three phase transformer. The transformer 828 has three sets of three-phase windings (primary, secondary and tertiary windings). The triangle is drawn in each circle (830, 835, 840) to signify that the windings are configured in a "delta" configuration. However, alternative embodiments may be configured in a "delta" or "wye" configuration. This transformer could be based on either delta or wye winding configurations or alternatively a combination of delta and wye windings. For the Star of David connection mesh configuration 850, the two sets of windings that connect to the mesh need to be of the same configuration (e.g., either both delta or both wye).

A 6-phase transformer 828 is coupled to the utility connection 814 that are three-phase connections (815, 820, 825) to the primary winding 830. The secondary and tertiary sets of windings (835, 840) are substantially identical to each other. But all of the tertiary windings 840 will be connected together reversed with respect to the secondary windings 835 (e.g., 180 degrees out of phase). The reversal, is based from a desired point of reference (i.e., the secondary windings are not reversed, whereas the tertiary windings are all reversed). The reversal of the tertiary windings 840 with respect to the secondary windings 835 is depicted in the three circle representation of this transformer by the fact that the equilateral triangles in the circles are pointing in opposite directions (each is rotated by 180 degrees from the other). The Star of David Mesh 850 does not include numbers as an exemplary configuration made be made from any number of interconnected power devices as shown for example, in the above FIGS. 6-8A.

While the foregoing is directed to embodiments of the present invention, other and further embodiments of the invention may be devised without departing from the basic scope thereof, and the scope thereof is determined by the claims that follow.

The invention claimed is:

1. A power mesh system comprising:
at least three polyphase power devices of a plurality of polyphase power devices, each having a phase connection for each phase, where each polyphase power device of the at least three polyphase power devices has each phase connection coupled to at least one phase connection of another polyphase power device from the plurality of polyphase power devices to form a two dimensional array of power devices such that (i) a current of each polyphase power device of the plurality of polyphase power devices is in proportion to a total system current of the two dimensional array of power devices, and (ii) a voltage of each polyphase power device of the plurality of polyphase power devices is in proportion to a total system voltage of the two dimensional array of power devices.

2. The system of claim 1, wherein each polyphase power device is a power source.

3. The system of claim 2, wherein each power source generates three phase power.

4. The system of claim 1, wherein each polyphase power device is a power sink such that each power sink absorbs three phase power.

5. The system of claim 1, wherein each polyphase power device comprises the same number of connections.

6. The system of claim 1, wherein the two dimensional array of power devices is coupled to a three-phase transformer.

7. The system of claim 6, wherein the power device is at least one three-phase power converter.

8. A method for power conversion by a power mesh system comprising:
converting power by a plurality of polyphase power devices, the plurality of polyphase power devices comprising at least three polyphase power devices each having (a) a phase connection for each phase and (b) each phase connection coupled to at least one phase connection of another polyphase power device from the plurality of polyphase power devices to form a two dimensional array of power devices, such that (i) a current of each polyphase power device of the plurality of polyphase power devices is in proportion to a total system current of the two dimensional array of power devices, and (ii) a voltage of each polyphase power device of the plurality of polyphase power devices is in proportion to a total system voltage of the two dimensional array of power devices.

9. The method of claim 8, wherein each polyphase power device is a three-phase power converter.

10. The method of claim 8, wherein the two dimensional array of power devices is coupled to a polyphase transformer and the polyphase transformer is a three-phase transformer.

11. The method of claim 10, wherein the three-phase transformer further comprises three single phase transformers.

12. The method of claim 11, wherein each single phase transformer is for a different phase.

13. The method of claim 8, wherein converting power by a plurality of polyphase power devices comprises converting DC power to AC power.

14. The method of claim 8, wherein converting power by a plurality of polyphase power devices comprises converting AC power to DC power.

15. The method of claim 8, wherein the polyphase power devices have a positive sequence or negative sequence of phase rotation.

16. The method of claim 8, wherein one power device is capable of compensating for another power device in the two dimensional array.

17. The method of claim 8, wherein the two dimensional array of power devices is coupled to a three-phase transformer.

* * * * *